March 29, 1966 A. MONTI 3,242,537
GASKET ASSEMBLY
Filed Feb. 21, 1964
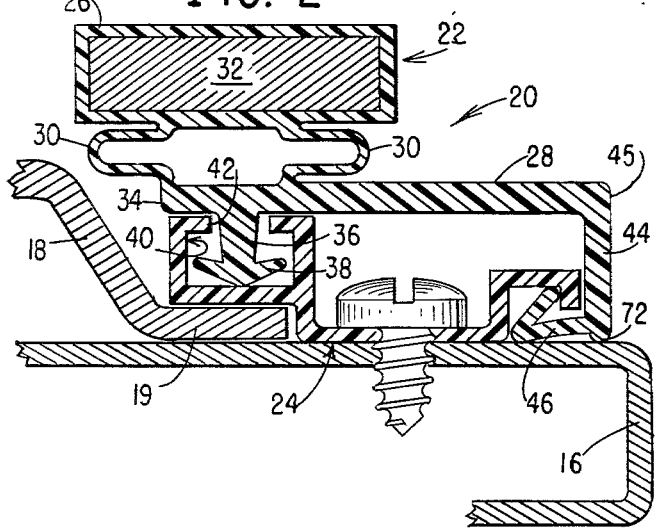
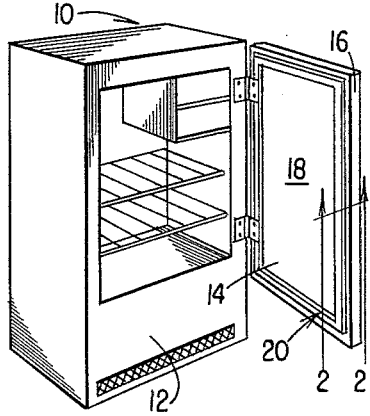
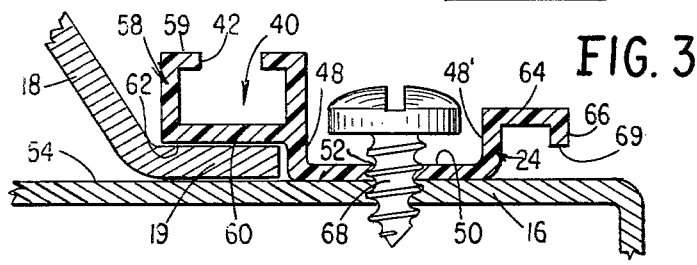
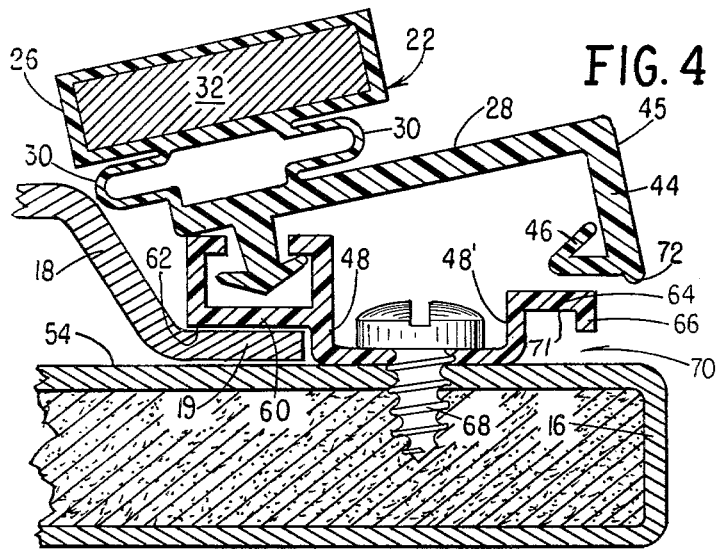
INVENTOR.
Angelo Monti
BY *Silverman + Cass*
Attys.

United States Patent Office 3,242,537
Patented Mar. 29, 1966

3,242,537
GASKET ASSEMBLY
Angelo Monti, Chicago, Ill., assignor to Jarrow Products, Inc., Chicago, Ill., a corporation of Illinois
Filed Feb. 21, 1964, Ser. No. 346,553
7 Claims. (Cl. 20—69)

This invention relates generally to gaskets and more particularly, concerns improvements in a gasket and retainer assembly for use upon the door or closure member of a refrigerator, freezer or the like having separable pan and shell members.

This application is an improvement upon the structure disclosed in my co-pending application, Serial No. 42,422 filed July 12, 1960, now Patent 3,126,589, for the invention entitled "Refrigerator Gasket."

In my co-pending application, there was disclosed and claimed an improved gasket and retainer structure which included a pair of elongate members, one formed of flexible material and functioning as a sealing gasket and the other formed of rigid material and functioning as a retainer adapted to be coupled with the gasket, said retainer functioning simultaneously to couple the pan and shell members of the door or closure member one to the other. Cooperative coupling means were provided on the gasket and the retainer removably to secure said gasket to said retainer, said means comprising a depending flange along the length of the gasket having an enlarged end portion and a channel formation formed on the retainer member, said channel having a narrow opening adapted to receive the flange with the enlarged end thereof passed therethrough because of the resilience of the gasket. The enlarged end, however, is held within the channel subsequent to the installation therewithin, but may be removed, such as for replacement, by urging same forcefully to pull the resilient enlarged end past the narrow opening. For the purposes of brevity in the foregoing description and claims and in keeping with the langauge utilized in my copending application, the said channel will be referred to as having a restricted opening. The relative length of the flange and depth of the channel were chosen to permit limited movement of the flange within the channel in order to compensate for surface variations on either the door or the cabinet surface whereby to reduce heat transfer between the interior and exterior of the cabinet when the closure is in closed position. The gasket and retainer structure thus described was also characterized by the provision, on the retainer structure, of means for coupling the pan and shell together. The invention was adapted for use with doors having a separable pan and a shell having a return bent flange to which the pan normally was secured.

Because of the nature of their construction, certain closure structures cannot accommodate the gasket assembly of said copending application. These structures may have the door comprised of a separable pan but the shell thereof may be formed as a hollow, double-walled structure which cannot accommodate the retainer of the copending application. In many of these instances, mounting means are utilized both to secure the pan and shell one to the other and to fasten either or both the gasket and the retainer to the door. A variety of retainer structures heretofore have been suggested, but most of these have a common disadvantage, namely, the gasket, pan and shell, if fastened together, are rendered not easily disengageable for maintenance, removal and/or necessary replacement when any of the parts have become worn. Many problems also are encountered during assembly of prior structures of this type. Some of these problems may be attributed to required simultaneous manipulation of a multiplicity of separate parts. Generally encountered is exposure of the fastening means detracting both from the appearance and the sealing efficiency of the gasket because of indentations or compressions of said mounting means causing variation or gaping along the edges of the gasket. Such gaps result in cold loss or leakage when the door is closed.

Accordingly, the principal object of this invention is to provide, in an improved gasket assembly of the type described, means whereby the disadvantages enumerated above are substantially eliminated and certain beneficial features of the gasket assembly of the co-pending application are used to advantage.

Another object of this invention is to provide a gasket assembly of the character described wherein first cooperable coupling means are provided along one edge of the assembly for removably securing a flexible gasket to a screw-mounted retainer member formed of relatively rigid material and the retainer element is arranged simultaneously to anchor the pan to the shell, the gasket and retainer having second cooperable coupling means for removably securing the gasket to the retainer along the opposite edge thereof.

Another object of the invention is to provide, in a gasket assembly of the character described, means on the outer edge of said retainer to define a laterally opening groove when the same is installed on the shell along the door edge and a hook-like formation provided on the outer edge of the gasket adapted to be juxtaposed relative said laterally opening groove when same is coupled to said retainer and whereby thereafter the said hook-like formation may be connectingly rolled into said groove substantially to conceal said retainer member.

Other objects of the invention include the provision of a gasket and retainer assembly of the screw-mounted type wherein the gasket easily may be removed and replaced without severing the connection between the pan and shell parts of the door or the connection between the retainer and the shell; which permits the pan and shell of the door to be pre-assembled prior to the installation of the gasket, thus reducing the number of parts to be manipulated during the assembly of the gasket assembly to the door; which functions materially to reduce heat transfer between the interior and the exterior of the cabinet when the closure is in closed position; which is characterized by the provision of means whereby the outer or visible edge of the assembly is provided with a straight line appearance not showing any indentations or compressions of any mounting screws; and, which covers the screws utilized to mount the retainer upon the door.

Other objects and advantages of the invention will become apparent as a description of a preferred embodiment thereof is set forth hereinafter with reference to the accompanying drawing.

In the drawing:
FIG. 1 is a perspective view of a refrigerator having the gasket assembly embodying the invention operably installed on the closure member thereof.
FIG. 2 is an enlarged fragmentary sectional view taken along line 2—2 of FIG. 1.
FIG. 3 is a sectional view similar to FIG. 2 but illustrating installation of the retainer initially.
FIG. 4 is a sectional view similar to FIG. 3 but illustrating the gasket being assembled to the retainer.

Referring to the drawing, FIG. 1 illustrates generally a representative refrigerator 10 having a closure member or door 14 hingedly secured to the cabinet body 12 thereof. The gasket assembly according to the invention is designated generally by reference character 20 and is shown installed upon the door 14. As seen in FIGS. 2 and 4, the door 14 is formed of a shell 16 and a pan 18. The shell 16 commonly is formed as a double wall, hollow member adapted to be filled with insulating material. The shell 16 also may be formed as a flat structure having a return-bent flange of the type designated 18 in my copending application. The pan 18 is a dish-shaped, rectangular member having an offset peripheral flange 19.

The gasket assembly 20 includes an elongate, flexible gasket member identified generally at 22 and a rigid retainer member identified generally at 24 adapted to be fastened to the shell 18. The gasket member 22 preferably is formed of an extruded length of resilient, flexible, rubber-like material having compression characteristics selected for achieving the desired seal for the door. The retainer 24 preferably is formed of a relatively rigid plastic material, such as, polyvinyl chloride, which can be extruded to shape. Extruded or rolled material such as aluminum may also be used to advantage in lieu of plastic material.

The gasket 22 includes an elongate hollow pocket or housing 26 of rectangular cross-section joined to a flat strip 28 by a pair of thin web portions 30 integral therewith. The housing 26 is adapted to receive one or more magnets 32 of complementary configuration and sealingly engages against the cabinet body 12 when the door 14 is closed. The pair of webs 30 define a hollow, collapsed bellows-type formation which functions as an air cushion in a conventional manner during opening and closing of the door. The housing 26 is co-extensive with the length of the strip 28 and connected by webs 30 closely adjacent one edge 34 of strip 28. Extending from the surface of said strip 28 opposite to the surface carrying webs 30, and being spaced from the edge 34 and co-extensive with the length of said strip 28, is provided a depending flange formation 36 having an enlarged end 38, preferably of arrowhead configuration. The retainer 24 is provided with a channel formation 40 having a restricted opening 42 facing toward the enlarged end 38 of flange formation 36. Together, the flange formation 36 and the channel formation 40 are equivalent to the cooperating coupling means provided on the gasket and the retainer of my co-pending application.

The strip 28 of the gasket 22 has a second flange 44 integral therewith and extending co-extensive with the edge 45 thereof, said edge 45 being defined as the outer edge of the strip 28 when the gasket is in installed position upon the door 14 while the edge 34 may be referred to as the inner edge of the strip 28 when said gasket is in such installed condition. Said flange 44 terminates in a hook-like formation 46 extending in a direction toward flange 36 facing toward the edge 34. The hook-like formation 46 may be slightly inclined toward the undersurface of strip 28 with the hook 46 opening to the flange 44. When the gasket is assembled, the said hook-like formation 46 cooperates with a flange provided upon the retainer to securely anchor the edge 45 to the retainer.

The retainer 24 is of shallow trough-like configuration and of a length substantially the same as the length of the gasket 22. Said trough-like configuration of the retainer 24 is defined by parallel side walls 48, 48', spaced apart by a base portion 50. Base 50 is relatively flat and is provided with a plurality of openings 52 adapted to receive sheet metal screws or other fastening means therethrough, the undersurface of the base being adapted to be secured on the surface 54 of the shell 16. In lieu of the openings 52, the base may have thin, frangible portions spaced along the length thereof which portions may be pierced by the screws when the retainer is secured upon the surface 54. One wall 48 has an elongate hollow offset formation 58 extending outwardly therefrom and co-extensive with the length of said retainer 24. Said hollow formation 58 is of hollow, rectangular configuration and has the restricted opening 42 in the top wall 59. The said hollow formation 58 defines the channel 40 and is of generally rectangular configuration, including a bottom wall portion 60 extending in a parallel plane relative to the door surface 54 but spaced therefrom a distance at least equal to the thickness of the flange 19. The side wall 48 and bottom wall 60 together define an area 62 adapted to accommodate the peripheral flange 19 of the pan when the base 50 is engaged upon the surface 54 of the shell 16. In this manner the pan is anchored in position on the shell at the same time that the retainer is fastened to said shell. The hollow formation 58 is positioned whereby said restricted opening 42 of the channel 40 faces the enlarged end 38 of the flange 36 along the entire length thereof.

The opposite wall 48' of the trough-like retainer 24 is provided with a relatively outwardly extending, overhanging flange formation 64 of inverted L-shaped configuration integral with the top edge thereof. The short leg 66 of flange 64 is disposed parallel to wall 48' and is of a length less than the height of said wall 48'. Thus the end 69 thereof defines, with the surface 54 of the door when the retainer is installed thereon, an entrance 70 to laterally opening groove 71 adapted to receive the hook-shaped formation 46 of the gasket therein.

Looking now at FIG. 3 the retainer 24 is shown in the process of being first secured to the door surface 54. The pan 18 is arranged upon the shell 16 and the retainer 24 is also arranged along the periphery of the shell 16 whereby the formation 58 overlies the peripheral flange 19 of the pan 18 and the wall 48 is positioned closely adjacent the edge of said flange 19. Sheet metal screws 68 are then passed through openings 52 in base 50 of the retainer and forced into the shell 16. The screws 68 are then tightened, thus anchoring the pan to the shell.

As illustrated in FIG. 4, the gasket 22 is then coupled to the retainer 24 by urging the enlarged end 38 of flange 36 through the restricted opening 42 of the channel 40 so that the strip 38 of the gasket 22 overlies the retainer 24, including flange 64 thereof, with edge 45 being free above the flange 64, and juxtaposed relative to the laterally opening groove 71. The strip 28 is then pressed as by rolling same with a roller, toward the overhanging flange 64 whereby the hook-like formation 46 is urged through the entrance 70 into said groove 71. The hook portion of said hook-like formation 46 engages the undersurface of flange 64. An outwardly extending rib 72 may also be provided at the juncture of flange 44 and hook-like formation 46 of the gasket whereby to urge the hook portion thereof into better engagement with said L-shaped flange 64 within the groove 71. Further, said rib 72 also functions to engage the surface 54 of the shell to seal off entrance 70.

The flexible gasket 22 is securely held in place upon the retainer along both lateral edges thereof but may easily be removed for replacement when necessary by first disengaging the hook-like formation 46 from the retainer and then disengaging enlarged portion 38 of flange 36 from channel 40. The pan 18 however remains adjacent upon the shell 16.

It should be understood that although a specific type of sealing or cushioning structure has been described herein as including flexible web portions and a housing containing magnetic members, many other configurations of sealing and cushioning structures may be formed as a part of the gasket 22 without loss in the advantages of the invention.

It should also be recalled that the flange 36 and channel 40 dimensions are selected to permit of limited movement of the enlarged portion 38 within the channel 40 to provide compensation for surface irregularities of the cabinet body while maintaining the effectiveness of the seal.

What is desired to be claimed under Letters Patent of the United States is:

1. A gasket assembly for a refrigerator having a cabinet body and a door hingedly secured thereto, said door having separable pan and shell portions, said gasket assembly comprising, at least two elongate members releasably coupled one to the other, one of said members being formed of relatively flexible material and serving as a gasket, the other one of said members being formed of relatively rigid material and serving as a retainer for said gasket, and means for securing said retainer to said shell, said gasket and said retainer having inner and outer longitudinal edges relative to their installed condition upon the door, said retainer having an inner edge formation adapted to overlie the pan in installed position on the shell, said retainer and said gasket having first cooperable means for releasably coupling one to the other along the inner edges of said gasket and retainer, and said retainer and said gasket having second cooperable coupling means for releasably coupling the gasket and retainer along the outer edges thereof, said second cooperable coupling means comprising a hook formation formed along the outer edge of the gasket and a flange formation formed along the outer edge of the retainer, said flange formation defining, with said shell in installed condition of the retainer, a laterally opening channel adapted to receive said hook formation therein when the same is urged therein.

2. A gasket assembly for a refrigerator having a cabinet body and a door hingedly secured thereto, said door having separable pan and shell portions, said gasket assembly comprising at least two elongate members releasably coupled one to the other, one of said members being formed of relatively flexible material and serving as a gasket, the other one of said members being formed of relatively rigid material and serving as a retainer for said gasket, said retainer also adapted to secure the pan upon the shell when fixedly secured to said shell surface closely adjacent the edge thereof, and fastening means for fixedly securing said retainer to said shell, said gasket and said retainer having inner and outer edges relative to their installed condition upon the door, said retainer having an inner edge formation adapted to overlie the pan in installed position on the shell whereby to hold the pan in place thereupon, said retainer and said gasket having first cooperable means for releasably coupling the same one to the other along the inner edge of said assembly and second cooperable means for releasably coupling the same one to the other along the outer edge of the assembly, said gasket overlying said retainer whereby to cover said fastening means in installed condition of said assembly, and said first cooperable coupling means comprises a first depending flange formation formed on said gasket integral therewith along the inner edge thereof, said first depending flange having an enlarged end along the length thereof, and a channel formation formed at said inner edge formation of said retainer, said channel formation adapted releasably to retain said flange formation therein, said second coupling means comprising a second depending flange along the outer edge of said gasket and an overhanging flange formation along the outer edge of the retainer, said second depending flange having an extension thereof engageable with said overhanging flange.

3. The gasket assembly as claimed in claim 2 in which said extension comprises a hook-like formation.

4. The gasket assembly as claimed in claim 3 wherein an outer rib is provided on the gasket at the junction of the second depending flange and the said hook-like formation.

5. A gasket assembly for a refrigerator having a cabinet body and a door and the door comprising separable pan and shell portions, said gasket assembly including at least two elongate members releasably coupled one to the other and one of said members being secured to said shell portion, said one member being formed of relatively rigid material and serving as a gasket retainer, the other one of said members being formed of flexible material and serving as a gasket, first cooperable coupling means formed integral with said gasket and retainer respectively releasably to fasten the gasket to the retainer along one edge thereof, and second cooperable coupling means also formed integral with said gasket and retainer respectively releasably to fasten the gasket to the retainer along the opposite edge thereof with the gasket overlying the retainer, said first cooperable coupling means comprising a first depending flange formation formed on the gasket and a channel formation formed on the retainer, said first depending flange having an enlarged end and said channel formation having a restricted opening along the length thereof toward said depending flange, the enlarged end being removably engageable within said channel formation through said restricted opening thereby coupling the gasket and retainer one to the other, and said second cooperable coupling means comprising a second depending flange integral with said opposite end of the gasket and having a return-bent hook-like terminal formation, and said retainer having an extension along its outer edge along the length thereof adapted releasably to be engaged by said hook-like terminal formation.

6. A gasket assembly for a refrigerator or the like having a body and a door hingedly secured thereto and said door having pan and shell means; said gasket assembly comprising: two elongate elements releasably coupled one to the other and adapted to be disposed along the edges of the door, one elongate element comprising a relatively rigid retainer member having a first coupling formation on its inner edge adapted to overlie the pan means when said pan means are associated with the shell, means enabling the fastening of said retainer member to said shell means, said retainer member having a second coupling formation on its outer edge of such configuration to define a laterally opening groove with said shell means along said door edge when said retainer member is secured to said shell means, said second elongate element being a resilient gasket member having a third coupling formation on its inner edge for cooperatively engaging the same with said first coupling formation, said gasket member having a hook-like formation on its outer edge adapted to be juxtaposed relative said laterally opening groove, whereby thereafter said hook-like formation may be connectingly rolled into said groove substantially to conceal said retainer member.

7. A structure as claimed in claim 6 in which said retainer member is adapted to be fastened to said shell means independently of said pan means, and said first coupling formation includes a channel defining portion spaced from the shell means in installed condition of the retainer member on the shell for accommodating the peripheral edge of said pan means.

References Cited by the Examiner

UNITED STATES PATENTS

| | | | |
|---|---|---|---|
| 1,998,791 | 4/1935 | Schanz. | |
| 2,619,693 | 12/1952 | Harle | 20—69 |
| 2,663,916 | 12/1953 | Millman | 20—35 |
| 2,665,456 | 1/1954 | Morton | 20—35 |
| 3,079,653 | 3/1963 | Cornell | 20—69 |
| 3,126,589 | 3/1964 | Monti | 20—69 |
| 3,126,590 | 3/1964 | Monti | 20—69 |
| 3,137,900 | 6/1964 | Carbary | 20—35 |
| 3,159,885 | 12/1964 | Cowles | 20—35 |
| 3,161,925 | 12/1964 | Bertolini | 20—69 |
| 3,164,869 | 1/1965 | Barkan. | |

HARRISON R. MOSELEY, *Primary Examiner.*

W. E. HEATON, *Assistant Examiner.*